United States Patent
Srinivasan et al.

(10) Patent No.: US 8,670,734 B2
(45) Date of Patent: Mar. 11, 2014

(54) SEARCHER DETECTION METRICS (71) Applicant: QUALCOMM Incorporated, San Diego, CA (US)

(72) Inventors: Shivratna Giri Srinivasan, San Diego, CA (US); Raghu Narayan Challa, San Diego, CA (US); Supratik Bhattacharjee, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/670,580

(22) Filed: Nov. 7, 2012

(65) Prior Publication Data

US 2013/0122841 A1 May 16, 2013

Related U.S. Application Data

(60) Provisional application No. 61/558,358, filed on Nov. 10, 2011.

(51) Int. Cl.
*H04B 1/10* (2006.01)

(52) U.S. Cl.
USPC .................. 455/226.1; 375/260; 375/346

(58) Field of Classification Search
USPC ............ 455/423, 424, 67.11, 67.14, 226.1, 455/226.2, 277.1, 277.2; 370/324, 330, 370/332, 335, 342, 350; 375/343, 344, 346, 375/347, 260
See application file for complete search history.

(56) References Cited

U.S. PATENT DOCUMENTS

| 7,415,084 B2* | 8/2008 | Pietraski et al. | 375/346 |
| 2003/0117979 A1* | 6/2003 | Chitrapu | 370/332 |
| 2004/0058650 A1* | 3/2004 | Palenius et al. | 455/67.11 |
| 2010/0226264 A1 | 9/2010 | Axmon et al. | |
| 2011/0223901 A1 | 9/2011 | Swarts et al. | |
| 2011/0286500 A1 | 11/2011 | Kim et al. | |

FOREIGN PATENT DOCUMENTS

| CN | 101827052 A | 9/2010 |
| WO | 2010062606 A1 | 6/2010 |
| WO | WO2011106786 | 9/2011 |

OTHER PUBLICATIONS

International Search Report and Written Opinion—PCT/US2012/064058—ISA/EPO—Jan. 24, 2013.
Li B et al., "Efficient SSS Detection for Neighbor Cell Search in 3GPP LTE TDD System", ICC 2011-2011 IEEE International conference on Communication—Jun. 5-9, 2011—Kyoto, Japan, IEEE, Piscataway, NJ, USA, Jun. 5, 2011, pp. 1-5, XP031908262, DOI:10.1109/ICC.2011.5962495, ISBN: 978-1-61284-232-5 the whole document.
Zhi, et. al., "A Novel Initial Cell Search Scheme in TD-LTE," Vehicular Technology Conference, IEEE, May 2011 pp. 1-5.

* cited by examiner

*Primary Examiner* — Thanh Le
(74) *Attorney, Agent, or Firm* — Patterson & Sheridan, L.L.P.

(57) ABSTRACT

Methods and apparatus for determining a reference sequence and timing based on normalized correlations are described. One example method generally includes receiving, at a first antenna of an apparatus, a first signal comprising a reference sequence; receiving, at a second antenna of the apparatus, a second signal comprising the same reference sequence; sampling the first and second signals to form first and second signal sequences; correlating the first and second signal sequences with each of one or more candidate sequences for the reference sequence using normalization; and determining the reference sequence and timing for the first and second signals based on the normalized correlations.

15 Claims, 7 Drawing Sheets

SEARCHER DETECTION METRICS

CROSS-REFERENCE TO RELATED APPLICATIONS

This application claims benefit of U.S. Provisional Patent Application Ser. No. 61/558,358, entitled "Searcher Detection Metrics" and filed Nov. 10, 2011, which is herein incorporated by reference.

BACKGROUND

I. Field

Certain aspects of the present disclosure generally relate to wireless communications and, more specifically, to determining a reference sequence and timing based on normalized correlations.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communications is provided. The method generally includes receiving, at a first antenna of an apparatus, a first signal comprising a reference sequence; receiving, at a second antenna of the apparatus, a second signal comprising the same reference sequence; sampling the first and second signals to form first and second signal sequences; correlating the first and second signal sequences with each of one or more candidate sequences for the reference sequence using normalization; and determining the reference sequence and timing for the first and second signals based on the normalized correlations.

In an aspect of the disclosure, an apparatus for wireless communications is provided. The apparatus generally includes means for receiving, at a first antenna, a first signal comprising a reference sequence; means for receiving, at a second antenna, a second signal comprising the same reference sequence; means for sampling the first and second signals to form first and second signal sequences; means for correlating the first and second signal sequences with each of one or more candidate sequences for the reference sequence using normalization; and means for determining the reference sequence and timing for the first and second signals based on the normalized correlations.

In an aspect of the disclosure, an apparatus for wireless communications is provided. The apparatus generally includes a receiver and a processing system. The receiver is generally configured to receive, via a first antenna, a first signal comprising a reference sequence and to receive, via a second antenna, a second signal comprising the same reference sequence. The processing system is typically configured to sample the first and second signals to form first and second signal sequences, to correlate the first and second signal sequences with each of one or more candidate sequences for the reference sequence using normalization, and to determine the reference sequence and timing for the first and second signals based on the normalized correlations.

In an aspect of the disclosure, a computer-program product for wireless communications is provided. The computer-program product generally includes a computer-readable medium having code for receiving, at a first antenna of an apparatus, a first signal comprising a reference sequence; for receiving, at a second antenna of the apparatus, a second signal comprising the same reference sequence; for sampling the first and second signals to form first and second signal sequences; for correlating the first and second signal sequences with each of one or more candidate sequences for the reference sequence using normalization; and for determining the reference sequence and timing for the first and second signals based on the normalized correlations.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
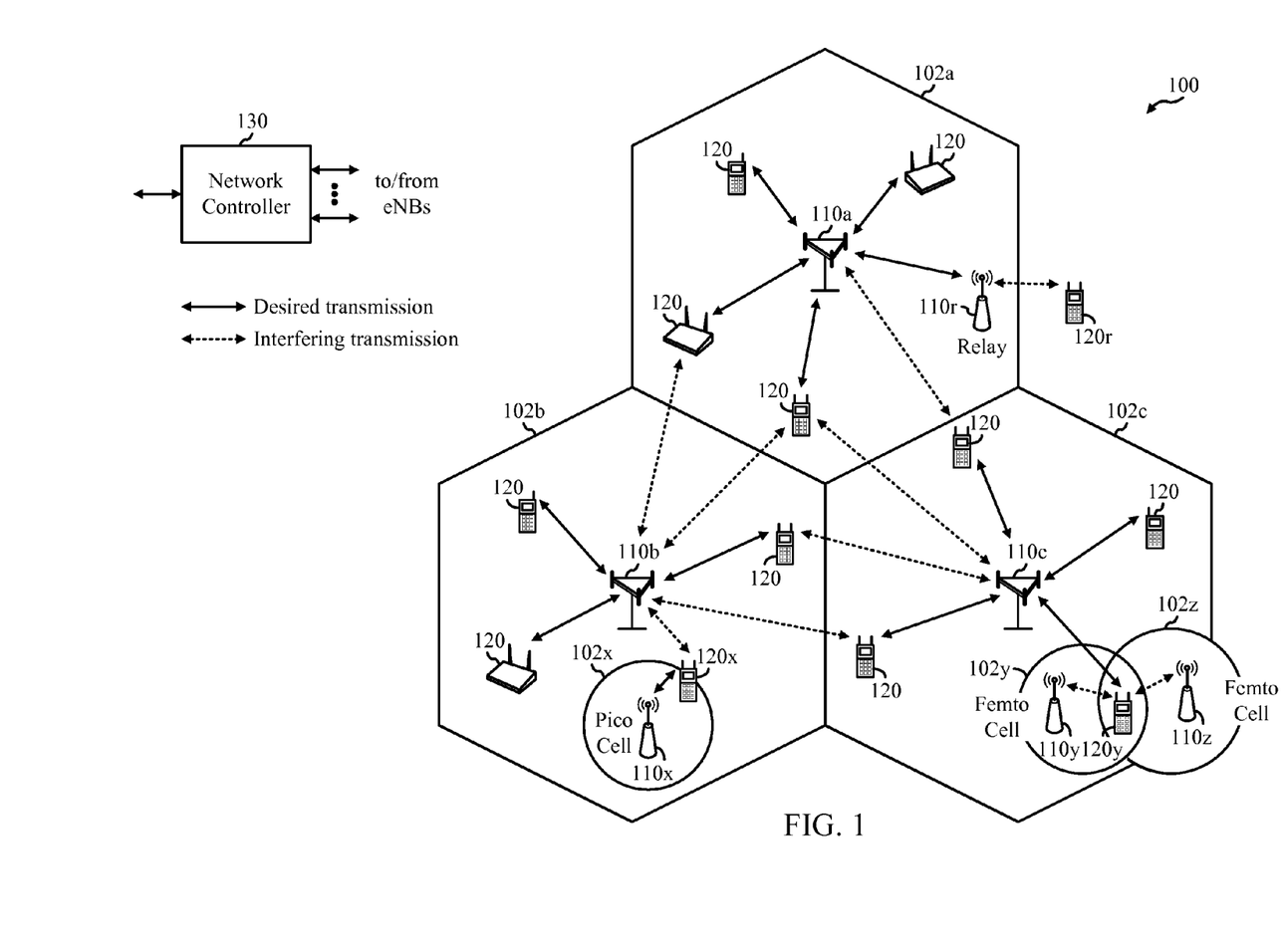
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
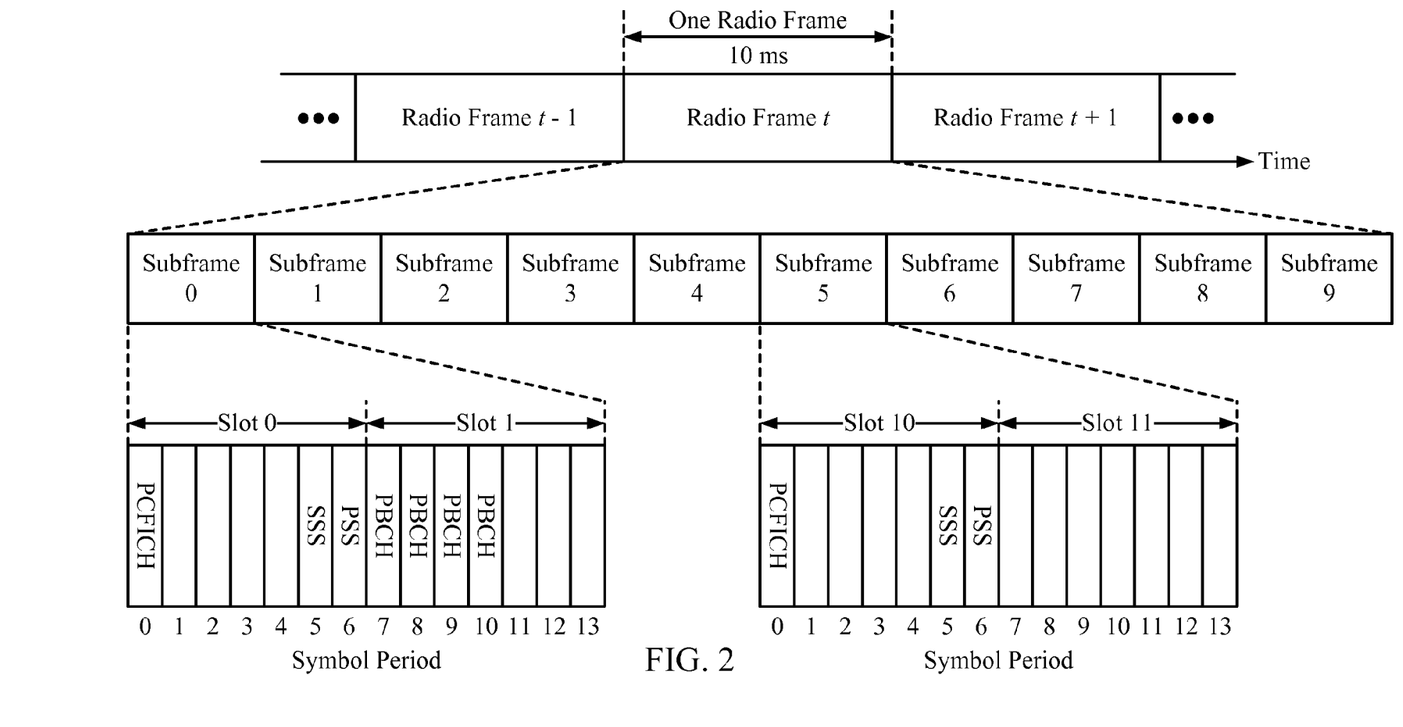
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
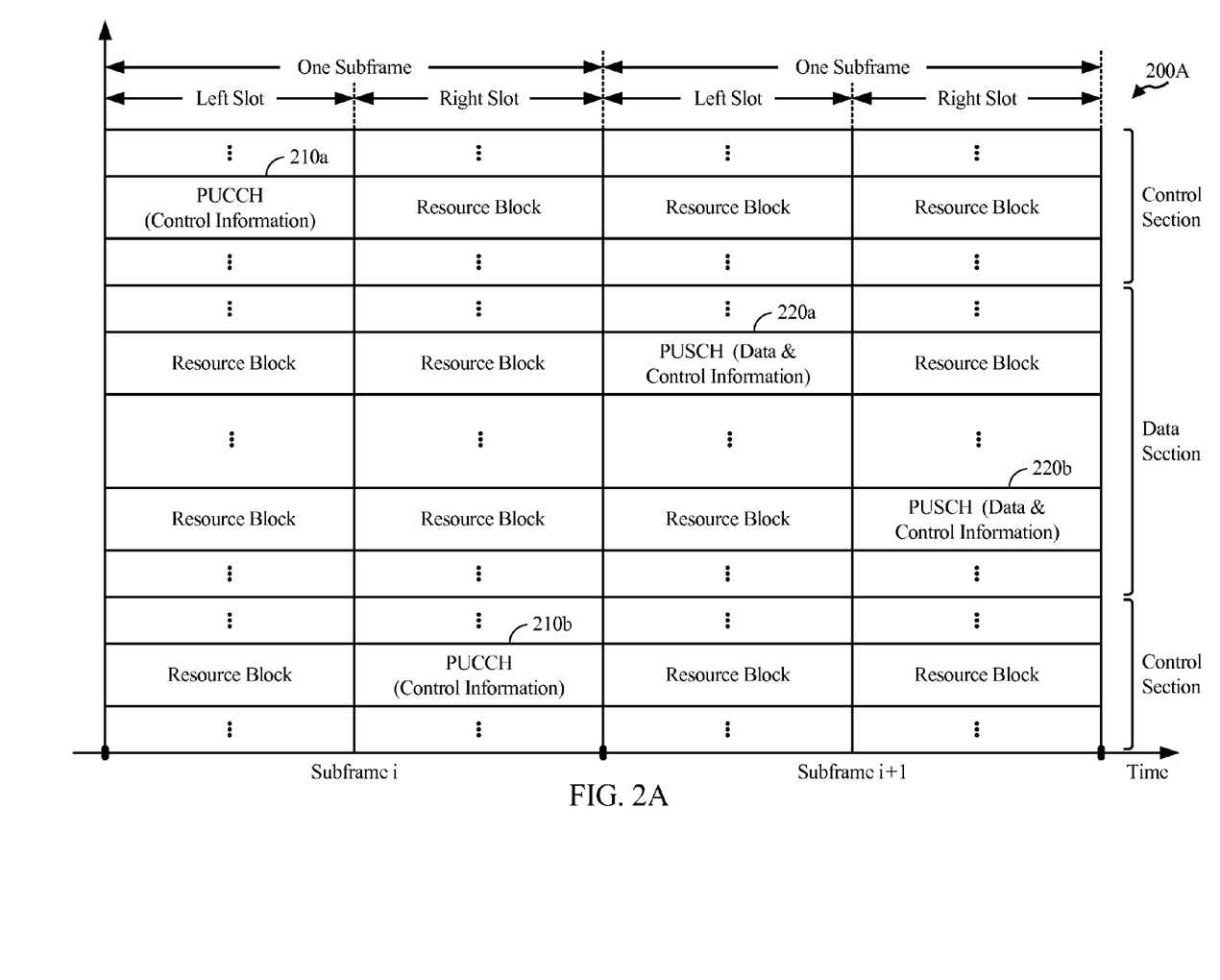
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
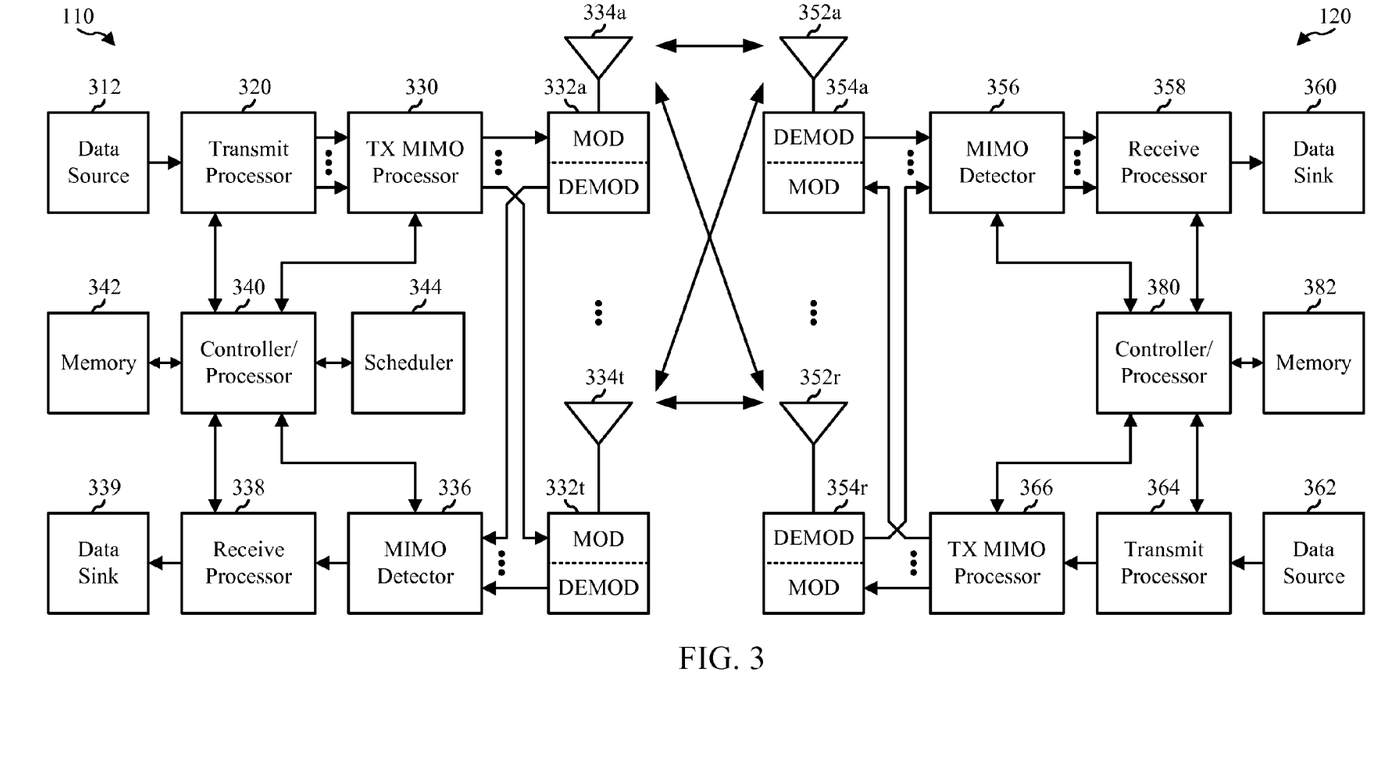
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations for blocks 500 in FIG. 5 and/or other processes for the techniques described herein. The memory 382 may store data and program codes for UE 120. A scheduler 344 may schedule UEs for data transmission on the downlink and/or uplink.

Example Searcher Detection Metrics

In LTE, cell identities range from 0 to 503. Synchronization signals are transmitted in the center 62 resource elements (REs) around the DC tone to help detect cells. The synchronization signals comprise two parts: a Primary Synchronization Signal (PSS) and a Secondary Synchronization Signal (SSS).

Figure 4:
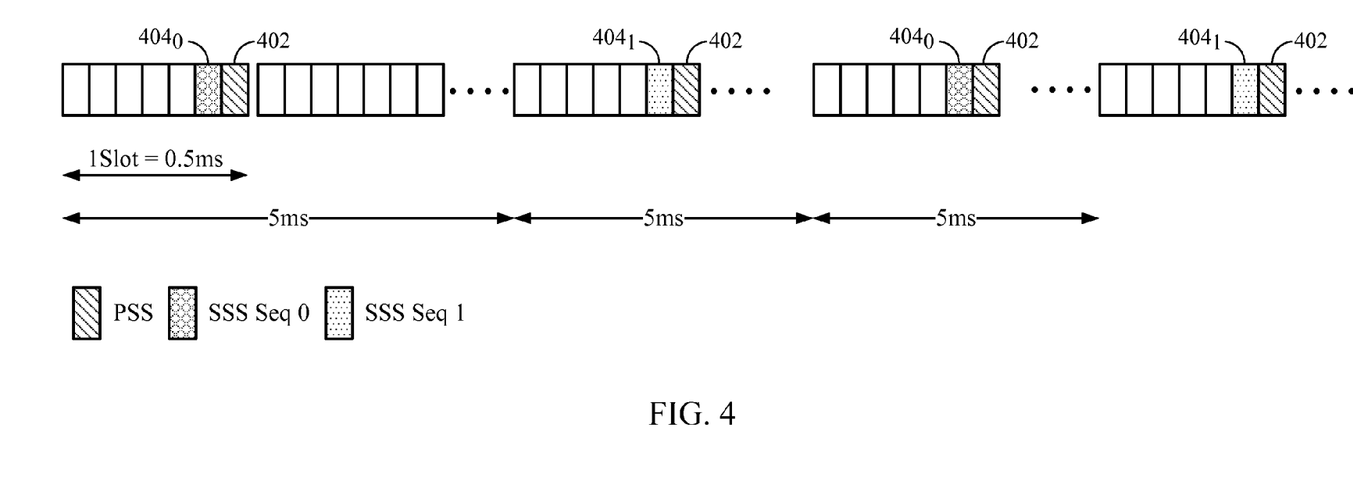
FIG. 4 illustrates an example Primary Synchronization Signal (PSS) sequence and alternating Secondary Synchronization Signal (SSS) sequences with a periodicity of 5 ms, in accordance with certain aspects of the present disclosure.

FIG. 4 illustrates an example PSS sequence 402 and alternating SSS sequences $404_0$, $404_1$ with a periodicity of 5 ms, in accordance with certain aspects of the present disclosure. The PSS allows a UE to obtain frame timing modulo 5 ms and part of the physical layer cell identifier (cell ID), and specifically cell id modulo 3. Three different PSS sequences exist with each sequence mapping to a disjoint group of 168 cell IDs. Based on Zadoff-Chu (ZC) sequences, the PSS sequence is chosen from one of 3 sequences based on a PSS Index=Cell ID modulo 3. The same sequence is transmitted every 5 ms as shown in FIG. 4.

The SSS is used by the UE to detect the LTE frame timing modulo 10 ms and to obtain the cell ID. The SSS is transmitted twice in each 10 ms radio frame as depicted in FIG. 4. The SSS sequences are based on maximum length sequences, known as M-sequences, and each SSS sequence is constructed by interleaving, in the frequency-domain, two length-31 Binary Phase Shift Keying (BPSK)-modulated sequences. These two codes are two different cyclic shifts of a single length-31 M-sequence. The cyclic shift indices of the M-sequences are derived from a function of the physical layer cell identity group. The two codes are alternated between the first and second SSS transmissions in each radio frame.

In other words, two sequences for a cell ID that alternate every 5 ms are transmitted. The SSS sequence is obtained by first choosing from a set of 168 different sequences (different sets for subframes 0 and 5) based on an SSS Index (=floor (Cell ID/3)) and then scrambling the chosen sequence using a sequence which is a function of the PSS Index. Hence, while searching for the SSS, if the PSS Index is known, a UE may only need to search up to 168 sequences.

Spacing between the PSS and the SSS helps a UE to distinguish between Extended Cyclic Prefix (CP) and Normal CP modes and between TDD (Time Division Duplex) and FDD (Frequency Division Duplex) modes.

A typical searching operation may involve first locating the PSS sequences transmitted by neighboring eNBs (i.e., determining the timing and the PSS index), followed by SSS detection for the found PSS Index around the determined timing.

Certain aspects of the present disclosure describe possible searcher metrics that may be used during LTE initial acquisition or neighbor search. The noise normalized searcher metrics described herein may be critically performed by the TDD searcher and may also increase the FDD searcher performance in certain scenarios.

In TDD mode prior to initial acquisition, uplink (UL) and downlink (DL) subframe boundaries are typically unknown. Therefore timing detection algorithms may account for the possibly large power difference between UL and DL transmissions, which may result in false alarms without appropriate normalizations to the searcher metric.

This disclosure primarily addresses the following two topics: (1) noise normalization in PSS/Timing detection and (2) noise normalization in SSS detection. Despite this disclosure dealing with LTE-specific scenarios, the techniques described herein are technology/standard agnostic and may apply to any searcher detection algorithm.

Example PSS/Timing Detection

In LTE, initial acquisition of timing is performed using the primary synchronization signal (PSS). For each possible timing hypothesis, the received samples are correlated against the reference sequence, and a correlation peak indicates a symbol boundary of the PSS.

If the noise across both receiver (Rx) antennas have the same average power (and are stationary and ergodic), equal weight noncoherent combining of the correlations across Rx antennas is indicated by the maximum likelihood (ML) detection rule. This is assuming a priori that the channel fading and additive noise is independent and identically distributed (i.i.d.) across Rx antennas.

In TDD mode, prior to initial acquisition, uplink (UL) and downlink (DL) subframe boundaries are unknown. Therefore timing detection algorithms may most likely account for the possibly large power difference between UL and DL transmissions, which may result in false alarms without appropriate normalizations to the searcher metric.

Another scenario is when the noise across Rx antennas is independent, but not identically distributed. In this scenario, the noise variance may be estimated using the PSS, and suitable normalizations may be applied while detecting the PSS. Note that maximum ratio combining (MRC) across Rx antennas pertains to the coherent detection case. A natural question that arises is how the PSS correlations across Rx antennas should be non-coherently combined.

Generally, the frame boundaries are not known until initial acquisition is complete. In the case of time division duplexing (TDD), this implies that the uplink and downlink subframes are also unknown during initial acquisition. Since the uplink and downlink transmission powers may be very different, correlating the PSS without some normalization may give rise to false alarms (e.g., correlation peaks that are due to an uplink signal being transmitted from a neighbor UE with large power are mistaken for a PSS transmitted from the downlink). Another undesirable scenario that may occur is when a strong barred cell hides a weaker non-barred cell.

Example PSS/Timing Detection with Noise Normalization

Having estimated the noise, one out of 3 PSS sequences may be detected. Assume that the fading coefficients $h_i$ and noise $n_i$ across different antennas are independent (i.e., the worst case assumption). The following equation represents the received signal for both Rx antennas:

$$\underbrace{\begin{bmatrix} y_1 \\ y_2 \end{bmatrix}}_{y} = \underbrace{\begin{bmatrix} xh_1 \\ xh_2 \end{bmatrix}}_{s} + \underbrace{\begin{bmatrix} n_1 \\ n_2 \end{bmatrix}}_{n} \quad \text{(Eq. 1)}$$

where the sequence x refers to one of the three possible PSS sequences in the set $\{x_0, x_1, x_2\}$. The term y refers to the noisy input data sequence at a certain timing hypothesis.

For this channel model, the following detection rules are possible:

1) No Normalization $$\underset{\substack{x \in \{x_0, x_1, x_2\} \\ \text{Over multiple time hypotheses of data } y}}{\operatorname{argmax}} |x^* y_1|^2 + |x^* y_2|^2 \quad \text{(Eq. 2)}$$

2) Normalization 1

$$\underset{\substack{\operatorname{argmax}_x \\ \text{Over multiple time hypotheses of data } y}}{} \frac{|x^* y_1|^2}{\frac{1}{N-1}(y_1^* y_1 - |x^* y_1|^2)} + \frac{|x^* y_2|^2}{\frac{1}{N-1}(y_2^* y_2 - |x^* y_2|^2)} \quad \text{(Eq. 3)}$$

3) Normalization 2

$$\underset{\substack{\operatorname{argmax}_x \\ \text{Over PSS indices and multiple time hypotheses of data } y}}{} \frac{|x^* y_1|^2}{\|y_1\|^2(y_1^* y_1 - |x^* y_1|^2)} + \frac{|x^* y_2|^2}{\|y_2\|^2(y_2^* y_2 - |x^* y_2|^2)} \quad \text{(Eq. 4)}$$

4) Normalization 3

$$\underset{\substack{\operatorname{argmax}_x \\ x \in \{x_0, x_1, x_2\} \\ \text{Over multiple time hypotheses of data } y}}{} \frac{\frac{|x^* y_1|^2}{\|x\|^2}}{\left(y_1^* y_1 - \frac{|x^* y_1|^2}{\|x\|^2}\right)} + \frac{\frac{|x^* y_2|^2}{\|x\|^2}}{\left(y_2^* y_2 - \frac{|x^* y_2|^2}{\|x\|^2}\right)} \quad \text{(Eq. 5)}$$

5) Normalization 4

$$\underset{\substack{\operatorname{argmax} \\ x \in \{x_0, x_1, x_2\} \\ \text{Over multiple time hypotheses of data } y}}{} \frac{|x^* y_1|^2}{\|y_1\|^2} + \frac{|x^* y_2|^2}{\|y_2\|^2} \quad \text{(Eq. 6)}$$

6) Normalization 5

$$\underset{\substack{\operatorname{argmax} \\ x \in \{x_0, x_1, x_2\} \\ \text{Over multiple time hypotheses of data } y}}{} \frac{|x^* y_1|^2}{E_1} + \frac{|x^* y_2|^2}{E_2} \quad \text{(Eq. 7)}$$

where $E_1$ and $E_2$ are average energy estimates obtained by averaging energies derived using a subset of time hypotheses of the data from Rx antenna 1 and Rx antenna 2. Normalization 5 may be thought of as slow normalization (rather than fast instantaneous normalization as adopted in Equations 5 and 6, for example). Alternatively, $E_1$ and $E_2$ may also be the outputs of a fast automatic gain control (AGC) loop that keeps the data power at a setpoint.

The noise normalization during PSS detection may most likely be performed during initial acquisition during TDD, since high powered uplink transmissions may result in false alarms during initial acquisition. However, the normalizations may also serve other purposes, including the following: (1) weighing the signal across Rx antennas appropriately (this may provides resilience against situations where one Rx antenna is experiencing larger noise than the other); (2) normalizing fading effects over time; and (3) allowing absolute thresholds to be applied independent of low-noise amplifier (LNA) gains applied.

Example SSS/Timing Detection with Noise Normalization

The same noise normalization metrics as described above may also be employed for SSS detection, which may help normalize the metric across receiver antennas.

Example Reference Sequence/Timing Detection with Normalization

Figure 5:
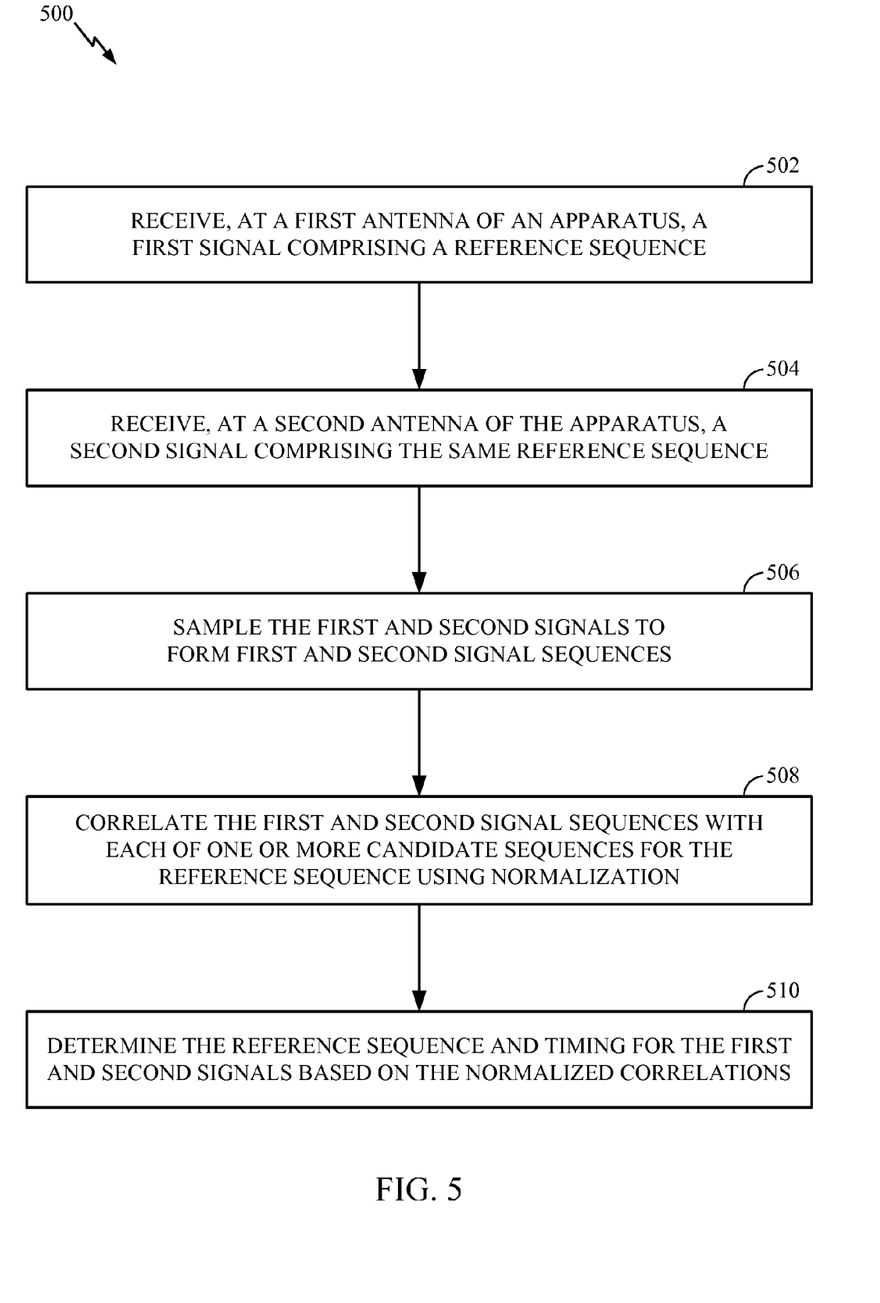
FIG. 5 is a flow diagram of example blocks executed to determine, from the perspective of the UE, a reference sequence and timing based on normalized correlations, in accordance with certain aspects of the present disclosure.

FIG. 5 is a flow diagram of example blocks 500 executed to determine, from the perspective of an apparatus (e.g., a UE), a reference sequence and timing based on normalized correlations, in accordance with certain aspects of the present disclosure. Operations illustrated by the blocks 500 may be executed, for example, at the antennas 352a-352r, demodulators 354a-354r, and processor(s) 358 and/or 380 of the UE 120 from FIG. 3.

The operations may begin at block 502 by receiving, at a first antenna of the apparatus, a first signal comprising (a noisy version of) a reference sequence. For certain aspects, the reference sequence may be a PSS or an SSS. At block 504, the apparatus may receive, at a second antenna, a second signal comprising (a noisy version of) the same reference sequence. The apparatus may sample the first and second signals to form first and second signal sequences at block 506.

At block 508, the apparatus may correlate the first and second signal sequences with each of one or more candidate sequences for the reference sequence using normalization. At block 510, the apparatus may determine the reference sequence and timing for the first and second signals based on the normalized correlations from block 508.

For certain aspects, using normalization may comprise dividing the square of the absolute value of the correlation for the first signal sequence by the square of the mathematical norm of the first signal sequence and dividing the square of the absolute value of the correlation for the second signal sequence by the square of the mathematical norm of the second signal sequence (e.g., Normalization 4 above). For other aspects, using normalization may comprise dividing the square of the absolute value of the correlation for the first signal sequence by a first average energy estimate associated with the first signal sequence and dividing the square of the absolute value of the correlation for the second signal sequence by a second average energy estimate associated with the second signal sequence (e.g., Normalization 5 above).

For other aspects, using normalization may comprise, for each of the candidate sequences: dividing the square of the absolute value of the correlations for the first and second signal sequences by the square of the mathematical norm of the candidate sequences to obtain first and second signal energy estimates for the first and second antennas, respectively; dividing the first signal energy estimate by the difference between the square of the mathematical norm of the first signal sequence and the first signal energy estimate; and dividing the second signal energy estimate by the difference between the square of the mathematical norm of the second signal sequence and the second signal energy estimate (e.g., Normalization 3 above). In other words, the first signal energy estimate may be subtracted from the square of the mathematical norm of the first sequence to obtain a first noise energy estimate of the first sequence, and the second energy estimate may be subtracted from the square of the mathematical norm of the second sequence to obtain a second noise energy estimate of the second sequence. The normalized correlation for the first sequence is then the ratio between the first signal energy estimate and the first noise energy estimate, and the normalized correlation for the second sequence is then the ratio between the second signal energy estimate and the second noise energy estimate.

According to certain aspects, determining the reference sequence comprises, for each of the candidate sequences, adding the normalized correlation for the first signal sequence with the normalized correlation for the second signal sequence to form a sum and declaring the candidate sequence with the highest sum among all timing hypotheses and candidate sequences as the reference sequence that was transmitted. For certain aspects, determining the timing for the first and second signals comprises determining frame timing based on the candidate sequence with the highest sum.

Figure 5A:
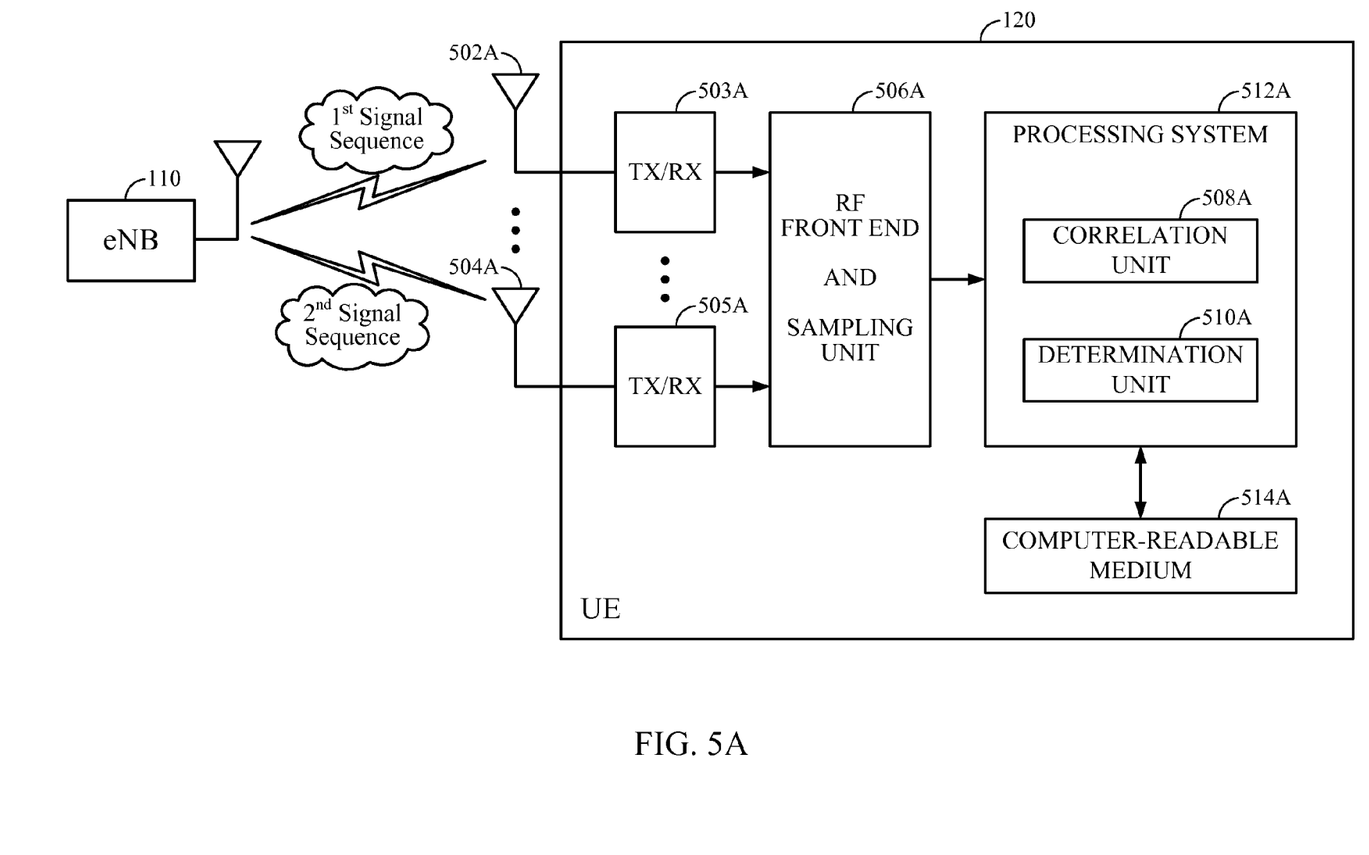
FIG. 5A illustrates example components capable of performing the operations illustrated in FIG. 5.

The operations for blocks 500 described above may be performed by any suitable components or other means capable of performing the corresponding functions of FIG. 5. For example, blocks 500 illustrated in FIG. 5 correspond to components 500A illustrated in FIG. 5A. In FIG. 5A, a first antenna 502A and a first transceiver (TX/RX) 503A may receive a first signal comprising a reference signal. A second antenna 504A and a second transceiver (TX/RX) 505A may receive a second signal comprising the same reference signal. A radio frequency (RF) front end and sampling unit 506A may sample the first and second signals to obtain first and second signal sequences. The sampling unit 506A may comprise an analog-to-digital converter (ADC), for example. A correlation unit 508A may correlate the first and second signal sequences with each of one or more candidate sequences for the reference sequence using normalization. A determination unit 510A may determine the reference sequence and timing for the first and second signals based on the normalized correlations from the correlation unit 508A. The correlation unit 508A and/or the determination unit 510A may be part of a processing system 512A, which may include one or more processors. The processing system 512A may be coupled to a memory or other storage or computer-readable medium 514A.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for receiving may comprise a receiver, a demodulator 354, and/or an antenna 352 of the UE 120 depicted in FIG. 3. Means for processing, means for determining, means for sampling, and/or means for correlating may comprise a processing system, which may include at least one processor, such as the receive processor 358, the transmit processor 364, and/or the controller/processor 380 of the UE 120 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
   receiving, at a first antenna of an apparatus, a first signal comprising a reference sequence;
   receiving, at a second antenna of the apparatus, a second signal comprising the same reference sequence;
   sampling the first and second signals to form first and second signal sequences;
   correlating the first and second signal sequences with each of one or more candidate sequences for the reference sequence using normalization, wherein using normalization comprises, for each of the candidate sequences:
      dividing the square of the absolute value of the correlations for the first and second signal sequences by the square of the mathematical norm of the candidate sequences to obtain first and second signal energy estimates for the first and second antennas, respectively;
      dividing the first signal energy estimate by the difference between the square of the mathematical norm of the first signal sequence and the first signal energy estimate; and
      dividing the second signal energy estimate by the difference between the square of the mathematical norm of the second signal sequence and the second signal energy estimate; and
   determining the reference sequence and timing for the first and second signals based on the normalized correlations.

2. The method of claim 1, wherein the reference sequence comprises a Primary Synchronization Signal (PSS).

3. The method of claim 1, wherein determining the reference sequence comprises:
   for each of the candidate sequences, adding the normalized correlation for the first signal sequence with the normalized correlation for the second signal sequence to form a sum; and
   declaring the candidate sequence with the highest sum among all timing hypotheses and candidate sequences as the reference sequence that was transmitted.

4. The method of claim 3, wherein determining the timing for the first and second signals comprises determining frame timing based on the candidate sequence with the highest sum.

5. The method of claim 1, wherein the reference sequence comprises a Secondary Synchronization Signal (SSS).

6. An apparatus for wireless communications, comprising:
means for receiving, at a first antenna, a first signal comprising a reference sequence;
means for receiving, at a second antenna, a second signal comprising the same reference sequence;
means for sampling the first and second signals to form first and second signal sequences;
means for correlating the first and second signal sequences with each of one or more candidate sequences for the reference sequence using normalization, wherein using normalization comprises, for each of the candidate sequences:
dividing the square of the absolute value of the correlations for the first and second signal sequences by the square of the mathematical norm of the candidate sequences to obtain first and second signal energy estimates for the first and second antennas, respectively;
dividing the first signal energy estimate by the difference between the square of the mathematical norm of the first signal sequence and the first signal energy estimate; and
dividing the second signal energy estimate by the difference between the square of the mathematical norm of the second signal sequence and the second signal energy estimate; and
means for determining the reference sequence and timing for the first and second signals based on the normalized correlations.

7. The apparatus of claim 6, wherein the reference sequence comprises a Primary Synchronization Signal (PSS).

8. The apparatus of claim 6, wherein the means for determining is configured to determine the reference sequence by:
for each of the candidate sequences, adding the normalized correlation for the first signal sequence with the normalized correlation for the second signal sequence to form a sum; and
declaring the candidate sequence with the highest sum among all timing hypotheses and candidate sequences as the reference sequence that was transmitted.

9. The apparatus of claim 8, wherein the means for determining is configured to determine the timing for the first and second signals by determining frame timing based on the candidate sequence with the highest sum.

10. The apparatus of claim 6, wherein the reference sequence comprises a Secondary Synchronization Signal (SSS).

11. An apparatus for wireless communications, comprising:
a receiver configured to:
receive, via a first antenna, a first signal comprising a reference sequence; and
receive, via a second antenna, a second signal comprising the same reference sequence; and
a processing system configured to:
sample the first and second signals to form first and second signal sequences;
correlate the first and second signal sequences with each of one or more candidate sequences for the reference sequence using normalization, wherein using normalization comprises, for each of the candidate sequences:
dividing the square of the absolute value of the correlations for the first and second signal sequences by the square of the mathematical norm of the candidate sequences to obtain first and second signal energy estimates for the first and second antennas, respectively;
dividing the first signal energy estimate by the difference between the square of the mathematical norm of the first signal sequence and the first signal energy estimate; and
dividing the second signal energy estimate by the difference between the square of the mathematical norm of the second signal sequence and the second signal energy estimate; and
determine the reference sequence and timing for the first and second signals based on the normalized correlations.

12. The apparatus of claim 11, wherein the reference sequence comprises a Primary Synchronization Signal (PSS).

13. The apparatus of claim 11, wherein the processing system is configured to determine the reference sequence by:
for each of the candidate sequences, adding the normalized correlation for the first signal sequence with the normalized correlation for the second signal sequence to form a sum; and
declaring the candidate sequence with the highest sum among all timing hypotheses and candidate sequences as the reference sequence that was transmitted.

14. The apparatus of claim 13, wherein the processing system is configured to determine the timing for the first and second signals by determining frame timing based on the candidate sequence with the highest sum.

15. The apparatus of claim 11, wherein the reference sequence comprises a Secondary Synchronization Signal (SSS).

* * * * *